US007949306B2

(12) United States Patent
Shah

(10) Patent No.: US 7,949,306 B2
(45) Date of Patent: May 24, 2011

(54) DISTORTION REDUCTION CALIBRATION

(75) Inventor: Peter Jivan Shah, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1027 days.

(21) Appl. No.: 11/077,696

(22) Filed: Mar. 10, 2005

(65) Prior Publication Data

US 2005/0159124 A1 Jul. 21, 2005

Related U.S. Application Data

(62) Division of application No. 10/066,115, filed on Feb. 1, 2002, now Pat. No. 7,657,241.

(51) Int. Cl.
*H04B 17/00* (2006.01)
(52) U.S. Cl. .............. 455/67.13; 455/226.1; 455/63.1; 455/296
(58) Field of Classification Search ............. 455/226.1, 455/63.1, 67.11, 73, 78, 83, 131, 313, 67.13, 455/67.14, 78.501, 232.1, 295, 296, 303, 455/310; 375/316, 344
See application file for complete search history.

(56) References Cited

U.S. PATENT DOCUMENTS

| 4,266,296 A | 5/1981 | Ishigaki |
| 4,301,445 A | 11/1981 | Robinson |
| 5,051,704 A | 9/1991 | Chapman |
| 5,161,170 A | 11/1992 | Gilbert et al. |
| 5,237,332 A | 8/1993 | Estrick et al. |
| 5,263,187 A | 11/1993 | Sugawa et al. |
| 5,361,400 A | 11/1994 | Kazecki et al. |
| 5,483,691 A | 1/1996 | Heck et al. |
| 5,541,990 A | 7/1996 | Rahamim ............... 379/402 |
| 5,552,734 A | 9/1996 | Kimura ............... 327/356 |
| 5,613,233 A | 3/1997 | Vagher |
| 5,697,081 A | 12/1997 | Lyall, Jr. et al. |

(Continued)

FOREIGN PATENT DOCUMENTS

CN 1309840 8/2001

(Continued)

OTHER PUBLICATIONS

Gray and Meyer, "Analysis and Design of Analog Integrated Circuits" 1984, Wiley, US XP002245777 p. 593-598.

(Continued)

*Primary Examiner* — John Lee
(74) *Attorney, Agent, or Firm* — William M. Hooks

(57) ABSTRACT

Techniques are disclosed for compensating for second-order distortion in a wireless communication device. In a zero-intermediate frequency (IF) or low-IF architecture, IM2 distortion generated by the mixer (20) results in undesirable distortion levels in the baseband output signal. A compensation circuit (104) provides a measure of the IM2 distortion current independent of the radio frequency (RF) pathway to generate an IM2 calibration current. The IM2 calibration current is combined with the baseband output signal to thereby eliminate the IM2 currents generated within the RF pathway. In one embodiment, the calibration is provided at the factory during final testing. In alternative embodiment, additional circuitry (156, 158) may be added to the wireless communication device to provide a pathway between the transmitter (150) and the receiver (146). The transmitter signal is provided to the receiver to permit automatic calibration of the unit. An internal signal source (162) may be used in place of the transmitter (150). The auto-calibration may be performed to eliminate IM2 distortion or permit optimization of the circuit to minimize other forms of distortion or interference.

10 Claims, 6 Drawing Sheets

U.S. PATENT DOCUMENTS

| | | | |
|---|---|---|---|
| 5,870,668 A | 2/1999 | Takano et al. | |
| 5,883,551 A | 3/1999 | Marchesani et al. | 455/126 |
| 5,912,586 A | 6/1999 | Mitzlaff | |
| 5,929,795 A | 7/1999 | Wang | |
| 6,009,129 A | 12/1999 | Kenney et al. | |
| 6,021,323 A | 2/2000 | Vagher | |
| 6,052,023 A | 4/2000 | Myer | |
| 6,072,997 A | 6/2000 | Kawai | 455/214 |
| 6,118,811 A | 9/2000 | Narumi | |
| 6,166,594 A | 12/2000 | Nielsen et al. | |
| 6,173,161 B1 | 1/2001 | Gross et al. | |
| 6,178,210 B1 | 1/2001 | Craig et al. | |
| 6,191,652 B1 | 2/2001 | Gentzler | 330/52 |
| 6,192,227 B1 | 2/2001 | Tenny | |
| 6,208,849 B1 | 3/2001 | Cho et al. | |
| 6,271,723 B1 | 8/2001 | Nagano et al. | |
| 6,377,616 B1 * | 4/2002 | Brankovic et al. | 375/224 |
| 6,437,644 B1 * | 8/2002 | Kenington | 330/149 |
| 6,480,705 B1 | 11/2002 | Kusunoki | |
| 6,535,725 B2 | 3/2003 | Hatcher et al. | |
| 6,545,487 B1 | 4/2003 | Ly | 324/620 |
| 6,606,484 B1 * | 8/2003 | Faulkner | 455/131 |
| 6,650,878 B1 | 11/2003 | Abe et al. | |
| 6,654,591 B1 | 11/2003 | Hoffmann | |
| 6,668,164 B2 | 12/2003 | Hughes | |
| 6,735,261 B1 * | 5/2004 | Oberschmidt et al. | 375/316 |
| 7,155,171 B2 | 12/2006 | Ebert et al. | |
| 2001/0051504 A1 | 12/2001 | Kubo et al. | |
| 2002/0065048 A1 | 5/2002 | Nagatani et al. | |
| 2002/0111152 A1 | 8/2002 | Razavi et al. | |
| 2002/0160734 A1 | 10/2002 | Li et al. | |
| 2003/0148748 A1 | 8/2003 | Shah | |
| 2003/0153273 A1 * | 8/2003 | Ebert et al. | 455/67.4 |
| 2003/0179042 A1 | 9/2003 | Ring | |
| 2004/0032296 A1 | 2/2004 | Akaiwa | |
| 2004/0106380 A1 * | 6/2004 | Vassiliou et al. | 455/73 |

FOREIGN PATENT DOCUMENTS

| | | |
|---|---|---|
| EP | 0473373 | 4/1994 |
| EP | 1067675 | 4/2005 |
| JP | 2000-515342 | 1/2000 |
| JP | 244252 | 9/2000 |
| JP | 2000244252 A | 9/2000 |
| JP | 024447 | 1/2001 |
| JP | 2001024447 A | 1/2001 |
| JP | 102947 | 4/2001 |
| WO | 9950966 | 10/1999 |
| WO | 9804050 | 12/2007 |

OTHER PUBLICATIONS

International Search Report—PCT/US03/003429, International Searching Authority—European Patent Office, Oct. 9, 2003.

* cited by examiner

DISTORTION REDUCTION CALIBRATION

CROSS REFERENCE TO RELATED APPLICATIONS

This application is a divisional of U.S. patent application Ser. No. 10/066,115, filed Feb. 1, 2002, now U.S. Pat. No. 7,657,241 entitled "DISTORTION REDUCTION CALIBRATION".

BACKGROUND

1. Field of the Invention

The present invention is related generally to wireless communication devices, and, more particularly, to a system and method for a distortion reduction calibration circuit in a wireless communication device.

2. Description of the Related Art

Wireless communication systems are proliferating as more and more service providers add additional features and technical capabilities. A large number of service providers now occupy a relatively limited portion of the radio frequency spectrum. Due to this crowding, increased interference between wireless communication systems is commonplace. For example, wireless communication systems from two different service providers may occupy adjacent portions of the spectrum. In this situation, interference may be likely.

One example of such interference occurs in a code division multiple access (CDMA) wireless system. In one embodiment, a CDMA system occupies a portion of the frequency spectrum adjacent to a portion of the frequency spectrum allocated to a conventional cellular telephone system, sometimes referred to as an advanced mobile phone system (AMPS).

Conventional CDMA units attempt to eliminate undesirable signals by adding filters following the mixer stage. FIG. 1 illustrates one known implementation of a direct-to-baseband or low IF wireless system 10 in which a radio frequency (RF) stage 12 is coupled to an antenna 14. The output of the RF stage 12 is coupled to an amplifier 16, which amplifies the radio frequency signals. It should be noted that the RF stage 12 and the amplifier 16 may include conventional components such as amplifiers, filters, and the like. The operation of these stages is well known and need not be described in greater detail herein.

The output of the amplifier 16 is coupled to a splitter 18 that splits the processed signal into two identical signals for additional processing by a mixer 20. The splitter 18 may be an electronic circuit or, in its simplest form, just a wire connection. The mixer 20 comprises first and second mixer cores 22 and 24, respectively. The mixers 22 and 24 are identical in nature, but receive different local oscillator signals. The mixer core 22 receives a local oscillator signal, designated LOI, while the mixer core 24 receives a local oscillator signal, designated as LOQ. The local oscillator signals are 90° out of phase with respect to each other, thus forming a quadrature mixer core. The output of the mixer 20 is coupled to jammer rejection filter stage 26. Specifically, the output of the mixer core 22 is coupled to a jammer rejection filter 28 while the output of the mixer core 24 is coupled to a jammer rejection filter 30. The operation of the jammer rejection filters 28 and 30 is identical except for the quadrature phase relationship of signals from the mixer 20. The output of the jammer rejection filters 28 and 30 are the quadrature output signals $I_{OUT}$ and $Q_{OUT}$ respectively.

The jammer rejection filters 28 and 38 are designed to remove unwanted signals, such as signals from transmitters operating at frequencies near the frequency of operation of the system 10. Thus, the jammer rejection filters 28 and 30 are designed to remove "out-of-band" signals. In operation, the jammer rejection filters 28 and 30 may be lowpass filters, bandpass filters, or complex filters (e.g., a single filter with two inputs and two outputs), depending on the implementation of the system 10. The operation of the jammer rejection filters 28 and 30 are well known in the art and need not be described in greater detail herein. While the jammer rejection filters 28 and 30 may minimize the effects of out-of-band signals, there are other forms of interference for which the jammer rejection filters are ineffective.

For example, distortion products created by the mixer 20 may result in interference that may not be removed by the jammer rejection filters 28 and 30. If one considers a single CDMA wireless unit, that unit is assigned a specific radio frequency or channel in the frequency spectrum. If an AMPS system is operating on multiple channels spaced apart from each other by a frequency $\Delta\omega_J$, then the second-order distortion from the mixer 20 will create a component at a frequency $\Delta\omega_J$ in the output signal. It should be noted that the second order distortion from the mixer 20 will create signal components at the sum and difference of the two jammer frequencies. However, the signal resulting from the sum of the jammer frequencies is well beyond the operational frequency of the wireless device and thus does not cause interference. However, the difference signal, designated herein as $\Delta\omega_J$, may well be inside the desired channel and thus cause significant interference with the desired signal.

In this circumstance, the AMPS signals are considered a jammer signals since they create interference and therefore jam the desirable CDMA signal. Although the present example refers to AMPS signals as jammer signals, those skilled in the art will appreciate that any other radio frequency sources spaced at a frequency of $\Delta\omega_J$ from each other may be considered a jammer.

If this second-order distortion signal is inside the channel bandwidth, the jammer rejection filters 28 and 30 will be ineffective and the resultant interference may cause an unacceptable loss of carrier-to-noise ratio. It should be noted that this interference may occur regardless of the absolute frequencies of the jammer signals. Only the frequency separation is important if the second-order distortion results in the introduction of an undesirable signal into the channel bandwidth of the CDMA unit.

Industry standards exist that specify the level of higher order distortion that is permitted in wireless communication systems. A common measurement technique used to measure linearity is referred to as an input-referenced intercept point (IIP). The second order distortion, referred to as IIP2, indicates the intercept point at which the output power in the second order signal intercepts the first order signal. As is known in the art, the first order or primary response may be plotted on a graph as the power out ($P_{OUT}$) versus power in ($P_{IN}$). In a linear system, the first order response is linear. That is, the first order power response has a 1:1 slope in a log-log plot. The power of a second order distortion product follows a 2:1 slope on a log-log plot. It follows that the extrapolation of the second order curve will intersect the extrapolation of the fundamental or linear plot. That point of intercept is referred to as the IIP2. It is desirable that the IIP2 number be as large as possible. Specifications and industry standards for IIP2 values may vary from one wireless communication system to another and may change over time. The specific value for IIP2 need not be discussed herein.

It should be noted that the second-order distortion discussed herein is a more serious problem using the direct down-conversion architecture illustrated in FIG. 1. In a conventional super-heterodyne receiver, the RF stage 12 is coupled to an intermediate frequency (IF) stage (not shown). The IF stage includes bandpass filters that readily remove the low frequency distortion products. Thus, second-order distortion is not a serious problem with a super-heterodyne receiver. Therefore, the IIP2 specification for a super-heterodyne receiver is generally not difficult to achieve. However, with the direct down-conversion receiver, such as illustrated in FIG. 1, any filtering must be done at the baseband frequency. Since the second-order distortion products at the frequency separation, $\Delta\omega_J$, regardless of the absolute frequency of the jammers, the IIP2 requirements are typically very high for a direct-conversion receiver architecture. The IIP2 requirement is often the single most difficult parameter to achieve in a direct down-conversion receiver architecture.

As noted above, the second-order distortion is often a result of non-linearities in the mixer 20. There are a number of factors that lead to imbalances in the mixer 20, such as device mismatches (e.g., mismatches in the mixer cores 22 and 24), impedance of the local oscillators, and impedance mismatch. In addition, factors such as the duty cycle of the local oscillator also has a strong influence on the second-order distortion. Thus, the individual circuit components and unique combination of circuit components selected for a particular wireless communication device results in unpredictability in the IIP2 value for any given unit. Thus, calibration of individual units may be required to achieve the IIP2 specification.

Therefore, it can be appreciated that there is a significant need for a system and method for wireless communication that reduces the undesirable distortion products to an acceptable level. The present invention provides this and other advantages as will be apparent from the following detailed description and accompanying figures.

SUMMARY

Novel techniques are disclosed for distortion reduction calibration. In an exemplary embodiment, a distortion reduction circuit for use in a wireless communication device has a radio frequency (RF) receiver and comprises a gain stage having an input coupled to the receiver and an output with the gain stage controlling an amplitude of an output signal related to a second order nonlinear response within the receiver. An output coupling circuit couples the gains stage output to the receiver.

In one embodiment, the gain stage amplitude control is based on the amplitude of the second order nonlinear response within the receiver. The signal related to the second order nonlinear response within the receiver may be inherently generated by circuitry within the receiver or may be generated by a squaring circuit coupled to the receiver.

When implemented with an RF receiver generating a down-converted output signal, the output coupling circuit may comprise an adder having first and second inputs with the first input configured to receive the output signal from the receiver and the second input configured to receive the gain stage output signal. The gain stage may generate an output current related to the second order nonlinear response within the receiver. The output coupling circuit may be a direct connection to the down-converted output signal of the receiver.

In one embodiment, the circuit is for use in a factor calibration wherein the receiver generates a down-converted output signal and is configured to receive an external input signal to permit the adjustment of the gain stage to thereby minimize the second order nonlinear response of the receiver output signal.

In another embodiment, an automatic calibration circuit may be used with the wireless communication device wherein a signal source generates a test signal and a switch is selectively activated to couple the signal source to a receiver input terminal to couple the test signal to the receiver input terminal and thereby permit distortion reduction adjustments on the receiver.

The switch circuit maybe selectively activated in an auto-calibration mode or activated at predetermined times.

In one embodiment, the signal source comprises an internal signal generator. The internal signal generator may generate the test signal having multiple frequency components having a predetermined spectral spacing. In another embodiment, the wireless communication device includes an RF transmitter and the circuit may further comprise a transmitter control to control an input signal to the transmitter and selectively activated during the auto-calibration process to generate the test signal. In one embodiment, the circuit may further include an attenuator coupled to a transmitter output terminal to generate an attenuated output signal as the test signal.

DETAILED DESCRIPTION

Figure 1:
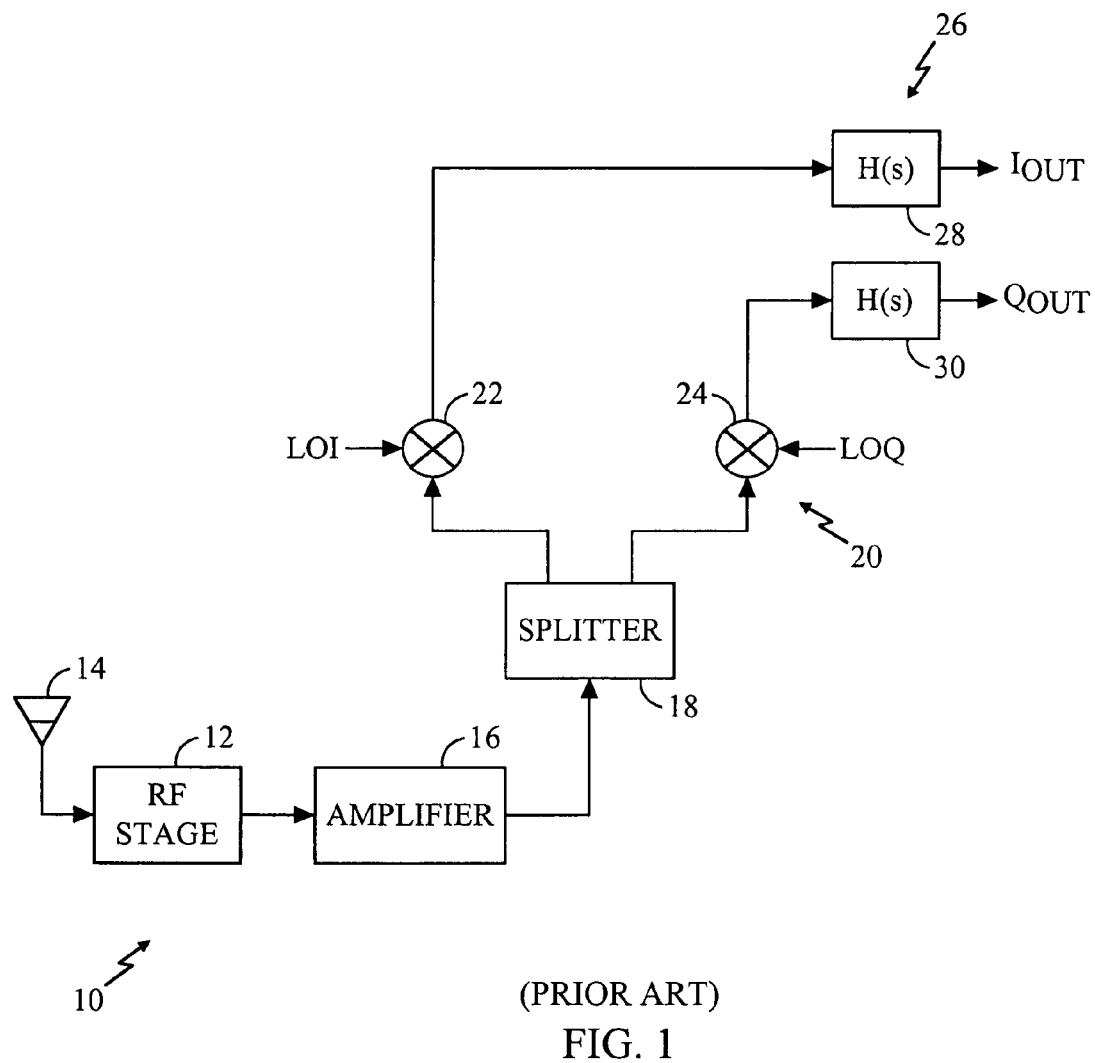
FIG. 1 is a functional block diagram of a conventional wireless communication receiver.

The present invention is directed to a calibration circuit and method that simplifies the calibration process for individual wireless communication devices. The term "wireless communication device" includes, but is not limited to, cellular telephones, personal communication system (PCS) devices, radio telephones, mobile units, base stations, satellite receivers and the like. In one embodiment, the calibration circuit is used at assembly to compensate for variations in components. In an alternative embodiment, also described herein, an onboard calibration circuit can be used to compensate for component mismatch due to circuit aging or other changes in circuit operational parameters.

IIP2 performance presents a major challenge in direct conversion down-converters. The required values of IIP2 are usually very high and the actual performance tends to be difficult to predict because it is almost exclusively determined by statistical phenomena. That is, component mismatch tends to be a statistical phenomena. Even so-called "matched" components on an integrated circuit are subject to variations in operating characteristics due to processing variations of an integrated circuit. Similarly, external components are also subject to variation that is unpredictable and cannot be readily accounted for in designing a radio frequency (RF) circuit.

There are some known techniques for suppressing IIP2 distortion, but these processes tend to be complicated or introduce new spurs (i.e., undesirable frequency components) and require a change in frequency plan (i.e., reallocation of the frequency spectrum). In addition, these known techniques interfere with the RF path and will degrade other RF parameters such as noise figure and IIP3. As a result, these known circuits lead to more complicated circuitry, increased cost, and decreased performance.

In contrast, the present invention uses a feed-forward technique, which relies on a one-time calibration at the phone level. The circuitry of the present invention is designed such that it does not interfere with the RF path, and the RF path can therefore be optimized for other RF performance parameters (e.g., noise figure and IIP3), independently of IIP2. All of the calibration works at baseband frequencies, which facilitates the design and layout and enables lower power consumption.

As previously discussed, the second order nonlinear distortion is a significant problem in direct conversion receiver architectures (i.e., zero IF or low IF architectures). While heterodyne receiver architectures also generate second order distortion, other conventional techniques may be used to reduce the unwanted nonlinear distortion. For example, careful selection of the IF frequency followed by IF filtering may typically reduce the second order nonlinear distortion to an acceptable level in heterodyne receivers. While the discussion herein uses low IF or zero IF examples, the principles of the present invention may be applied to other receiver architectures, including heterodyne receivers.

Furthermore, the description presented herein may refer to a baseband signal, resulting from a low IF or zero IF mixing. However the principles of the present invention apply generally to a down-converted signal that is generated by a mixer. Therefore, the present invention is not limited by the receiver architecture, but can generally be applied to any down-converted signal having a second order nonlinear distortion.

Figure 2:
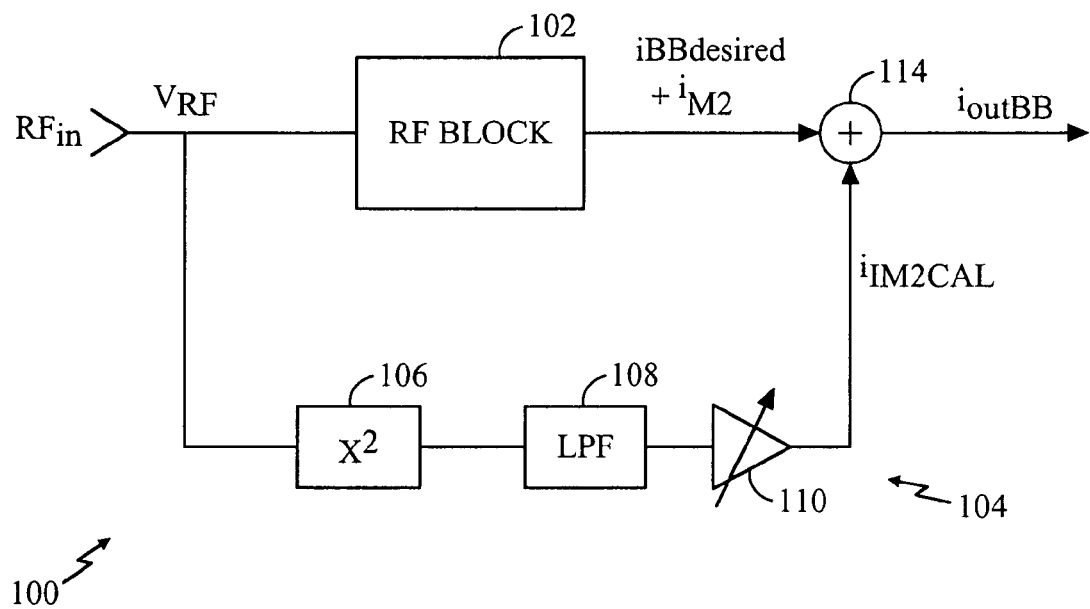
FIG. 2 is a functional block diagram of a generic implementation of the present invention.

The present invention is embodied in a system 100, which is shown in an exemplary form in the functional block diagram of FIG. 2. The system 100 processes an $RF_{in}$ signal, which is illustrated in FIG. 2 in the form of a voltage ($V_{RF}$). The $RF_{in}$ signal is processed by a conventional RF block 102. The RF block may include amplifiers, filters, and the like. In addition, the RF block typically includes a mixer, such as the mixer 20 illustrated in FIG. 1 to convert the RF signal to a baseband signal. As illustrated in FIG. 2, the baseband signal comprises components that are identified as $i_{BBdesired}+i_{IM2}$. This is intended to represent the desired baseband signal combined with the undesirable signal resulting from second order distortion within the RF block 102.

The system 100 also includes a compensation branch 104, which comprises a squaring circuit 106, lowpass filter 108, and variable gain amplifier (VGA) 110. The squaring circuit 106 provides a squared version of the voltage $V_{RF}$. As those skilled in the art will appreciate, the squaring circuit produces a number of undesirable harmonics at multiple frequencies. The low pass filter 108 is designed to eliminate the undesirable frequencies so that the compensation branch 104 does not produce undesirable interference. The VGA 110 is used to attenuate or amplify a compensation signal identified in FIG. 2 as $i_{IM2cal}$. The compensation signal $i_{IM2cal}$ is combined with the output of the RF block by an adder 114. The output of the adder 114 is the desired signal $i_{outBB}$. If the compensation current $i_{IM2cal}$ equals the undesirable signal component $i_{IM2}$, the output signal $i_{outBB}$ equals the desired signal $i_{BBdesired}$.

As illustrated in FIG. 2, the IM2 calibration scheme relies on canceling the IM2 output current generated by the RF block 102 with a programmable IM2 current derived from another source. In the present example, the programmable compensation current is derived directly from the RF signal, but does not interact with the RF pathway in the RF block 102.

Thus, the advantage of this technique is that it does not interfere with the RF path. Therefore, the introduction of IM2 calibration will not degrade other RF parameters such as gain, noise figure and IIP3.

For proper cancellation of the undesirable signal by the adder 114, the two IM2 currents (i.e., $i_{IM2}$ and $i_{IM2cal}$) must either be in-phase or 180 degrees out of phase. Due to the mechanism generating IM2, this is expected to be the case and will be derived below. As noted above, the RF block 102 contains conventional components, such as the mixer 20 (see FIG. 1). The IM2 current generated by the mixer 20 can be expressed in the form:

$$i_{IM2mix}(t)=\alpha_{2mix} \cdot V_{RF}(t)^2 \quad (1)$$

Expressing $V_{RF}$ in polar form and taking into account that it may be attenuated by some factor $\alpha_{mix}$ and phase-shifted by some phase $\phi_{mix}$ through the mixer circuitry, we obtain:

$$i_{IM2mix}(t)=\alpha_{2mix} \cdot (\alpha_{mix} \cdot A(t) \cos(\omega_{RF} \cdot t + \phi(t) + \phi_{mix}))^2 \quad (2)$$

and expanding this yields $$i_{IM2mix}(t) = \frac{1}{2} \cdot a_{2mix} \cdot a_{mix}^2 \cdot A(t)^2 (1 + \cos(2\omega_{RF} \cdot t + 2\phi(t) + 2\phi_{mix})) \quad (3)$$

A portion of the signal represented by equation (3) is dependent on a value $2\omega_{RF}$. This portion of equation (3) is of little concern in this analysis since it is very high frequency and will be filtered away using conventional techniques. However, the low-frequency part could land inside the desired baseband channel. So the IM2 product of interest from equation (3) is $$i_{IM2mixLF}(t) = \frac{1}{2} \cdot a_{2mix} \cdot a_{mix}^2 \cdot A(t)^2 \quad (4)$$

Similarly, the IM2 compensation current generated at the output of the VGA 110 in FIG. 2 is given by $$i_{IM2cal}(t) = \frac{1}{2} \cdot a_{cal} \cdot A(t)^2 \quad (5)$$

where $\alpha_{cal}$ is a programmable scaling factor. Cancellation of IM2 by the adder 114 is achieved when $$\alpha_{cal}=-\alpha_{2mix} \cdot \alpha_{mix}^2 \quad (6)$$

Thus, IM2 cancellation should be possible independently of the RF phase shift $\phi_{mix}$ through the mixer.

Figure 3:
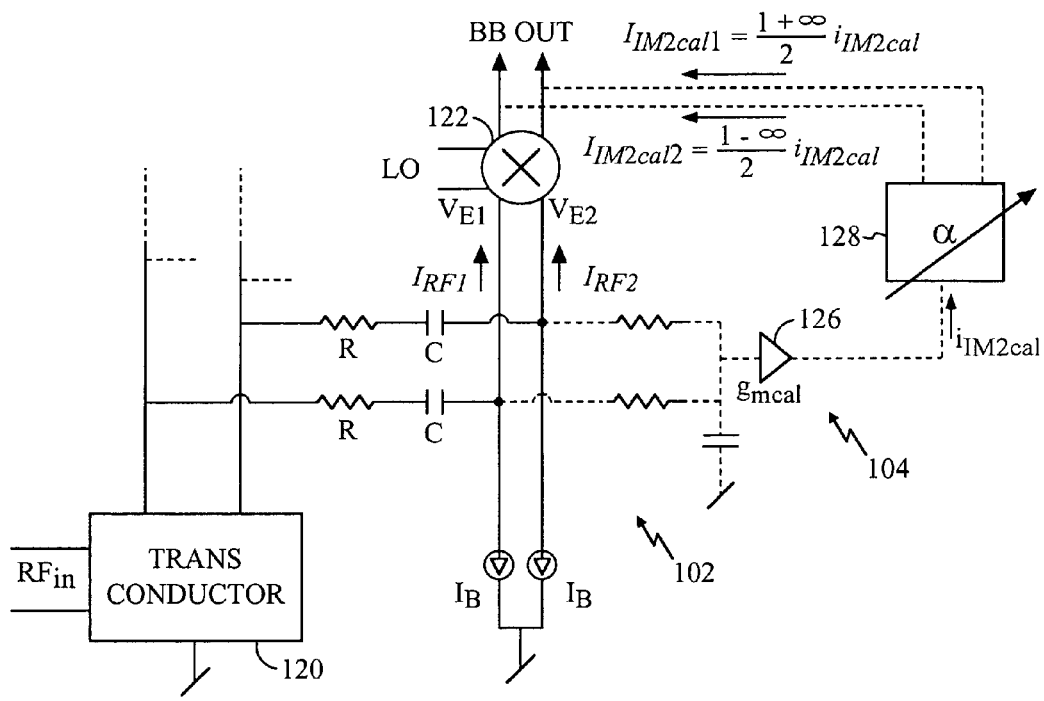
FIG. 3 is a functional block diagram of a receiver mixer illustrating one implementation of the present invention.
Figure 3:
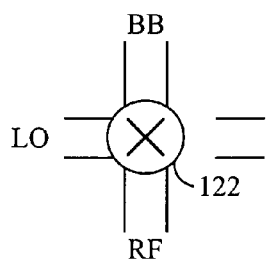
Figure 3:
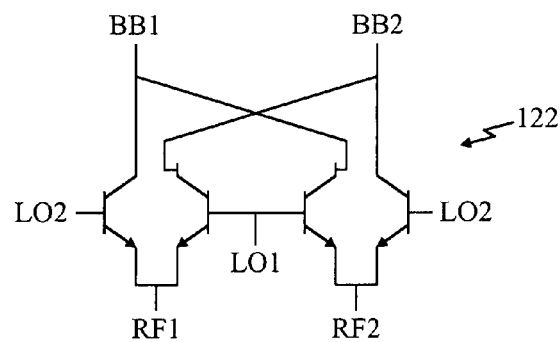

In a typical implementation of the RF block 102, the mixer cores are the main IM2 contributors. Therefore, to improve tracking between the IM2 source (i.e., the mixer core) and the IM2 calibration signal, it would be desirable to derive the IM2 calibration signal from the mixer cores themselves. This is fortunately straight-forward, because the emitter-nodes of the mixer core present a strong second-order non-linearity. Conceptually, the IM2 calibration circuit can be implemented as shown in the functional block diagram of FIG. 3. For the sake of clarity, FIG. 3 illustrates only a single mixer core (i.e., either the I mixer or the Q mixer core). Those skilled in the art will recognize that an additional mixer core and calibration circuit are implemented in accordance with the description provided herein. It should also be noted that the simplified functional block diagram of FIG. 2 represents a single ended system while the functional block diagram of FIG. 3 is a differential implementation with differential inputs and differential outputs. Those skilled in the art will recognize that the principles of the present invention may be applied to single ended or differential systems.

The RF block 102 comprises a transconductor 120, which receives the input signal $RF_{in}$ in the form of a differential voltage and generates differential output signals that are coupled to the inputs of a mixer core 122 through a series combination of a resistor R and a capacitor C. The output of the transconductor 120 illustrated in dashed lines are inputs to the other mixer core (not shown). The resistor R and capacitor C serve as current dividers to provide current to the mixer core 122 and the other mixer (not shown). The input currents to the mixer core 122 are identified in FIG. 3 as $I_{RF1}$ and $I_{RF2}$, respectively. It should be noted that the series RC circuit is not essential to the successful operation of the present invention. Rather, the RC circuit is merely one implementation of the splitter 18 (see FIG. 1). The present invention is not limited by the specific implementation of the splitter 18. The mixer core 122 also receives a differential local oscillator (LO) as an input and generates a differential baseband output signal (BB OUT).

The mixer core 122 is shown in FIG. 3 using conventional symbols for schematic diagram. The mixer core may be implemented by a transistor circuit shown at the bottom of FIG. 3 using cross-coupled transistors in a known configuration for a differential mixer. The emitters of the various transistors in FIG. 3 are coupled together to form first and second input nodes that receive the RF signal. The input nodes are biased by bias current sources $I_B$ in a known manner. In an alternative embodiment, the transconductor 120 may supply sufficient bias current thus enabling the elimination of the bias current sources $I_B$.

The transistor arrangement of the mixer core 122 illustrated in FIG. 3 comprises first and second pairs of transistors whose emitters are coupled together to form the input nodes of the mixer core 122. The input nodes of the mixer core 122 are driven by the currents $I_{RF1}$ and $I_{RF2}$, respectively. Also illustrated at the input nodes of the mixer core 122 in FIG. 3 are voltages $V_{E1}$ and $V_{E2}$, respectively. As those skilled in the art can appreciate, the non-linear operation of the transistors result in a second order non-linearity of the input signal which is present at the input nodes of the mixer core 122. This non-linear component is represented by the voltage $V_{E1}$ and $V_{E2}$ at the input nodes of the mixer core 122. In the embodiment illustrated in FIG. 3, there is no need for an external squaring circuit, such as the squaring circuit 106 illustrated in FIG. 2. Rather, the system 100 relies on the second order nonlinear signal inherently generated within the mixer core 122. The current $I_{RF1}$ and $I_{RF2}$ may be thought of as inputs to a squaring circuit (e.g., the squaring circuit 106 of FIG. 2) while the voltage $V_{E1}$ and $V_{E2}$ may be considered as outputs of the squaring circuit. The advantage of the implementation in FIG. 3 is that the squaring function is an inherent byproduct of the mixer core 122 and requires no additional circuitry (e.g., the squaring circuit 106) to generate the squared term used by the compensation branch 104. A further advantage of the implementation illustrated in FIG. 3 is that the squared signal is generated by the mixer core 122 itself, which is also the source of the nonlinearity within the mixer core that results in the undesirable IM2 signal (represented in FIG. 2 as $i_{IM2}$). Thus, the compensation current generated by the compensation branch 104 in FIG. 3 advantageously tracks the nonlinear signal generated within the mixer core 122. Other components within the RF block 102 may be also serve as the source of the second order nonlinear signal. For example, the transconductor 120 may generate the second order nonlinear signal.

FIG. 3 also illustrates an implementation of the compensation branch 104. Coupling resistors couple the RF currents $I_{RF1}$ and $I_{RF2}$ to a gain stage 126. The output of the gain stage 126 is coupled to a variable attenuator 128 which generates calibration currents $I_{IM2cal1}$ and $I_{IM2cal2}$.

The calibration current can be written as:

$$i_{IM2cal} = I_{IM2cal1} - I_{IM2cal2} = \alpha \cdot g_{mcal} \cdot v_E = \alpha \cdot g_{mcal} \cdot \alpha_{2core} \cdot I_{RF}^2 \quad (7)$$

which is of the desired form.

Using the emitter node of the mixer core 122 as the IM2 source for the calibration is desirable because, from a simplified point of view, the IM2 generated by the mixer cores can be explained as the strong IM2 signal present on the emitter node leaking unequally to the two outputs due to mismatches in the transistors used to implement the mixer core. If no mismatch were present, the mixer core would not generate any differential IM2 because the emitter IM2 would leak equally to both sides. Thus, it would be expected that the output IM2 tracks the emitter IM2 (i.e., the output IM2 would be given as a mismatch factor times the emitter IM2).

In the absence of temperature dependencies, the calibration current characterized in equation (7) above would provide a suitable correction current to eliminate IM2 generated by the mixer cores. Unfortunately, simulations show that this mismatch factor is temperature dependent, and the dependency depends on the type of mismatch (e.g., emitter resistance mismatch gives a different temperature profile than base-emitter capacitance mismatch, etc.). In practice, one type of mismatch will typically dominate so that the temperature dependence is repeatable. Therefore, it is desirable to let the α factor have a programmable temperature dependence. Thus, the term α in equation (7) may be altered to include the following characteristic:

$$\alpha = \alpha_{cal} \cdot \left(1 + \beta_{cal} \cdot \frac{T - T_0}{T_0}\right) \quad (8)$$

where $\alpha_{cal}$ and $\beta_{cal}$ are programmable constants, T is temperature and $T_0$ is the temperature at which calibration is performed.

Figure 4:
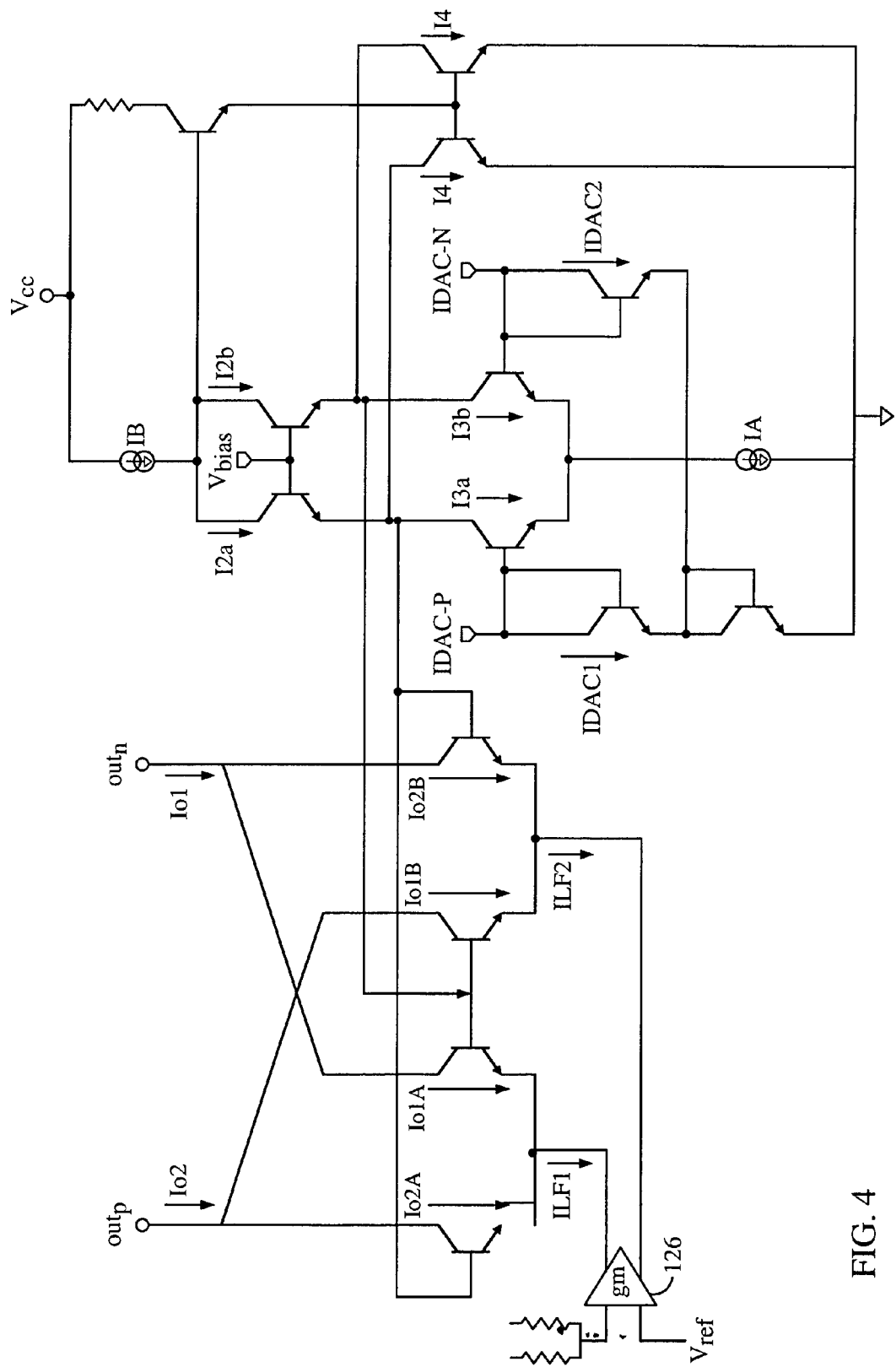
FIG. 4 is a schematic diagram illustrating one possible implementation of the present invention.

The abbreviated schematic of FIG. 4 illustrates a circuit that implements the desired calibration function. It uses a current steering DAC to set the calibration factor and currents $I_A$ and $I_B$ to set the temperature dependence. The circuit works as follows:

Firstly, we rewrite the various currents in terms of $I_A$, $I_B$, $I_{ref}$ and $I_{LF}$:

$$I_{DAC1} = \frac{1}{2} \cdot (1 + \alpha_{DAC}) \cdot I_{ref} \quad (9)$$

$$I_{DAC2} = \frac{1}{2} \cdot (1 - \alpha_{DAC}) \cdot I_{ref}$$

$$I_{o1A} = \frac{1}{2} \cdot (1 + \alpha_o) \cdot I_{LF1}$$

$$I_{o2A} = \frac{1}{2} \cdot (1 - \alpha_o) \cdot I_{LF1}$$

$$I_{o1B} = \frac{1}{2} \cdot (1 + \alpha_o) \cdot I_{LF2}$$

-continued $$I_{o2B} = \frac{1}{2} \cdot (1 - \alpha_o) \cdot I_{LF2}$$

$$I_{2a} = \frac{1}{2} \cdot (1 + \alpha_2) \cdot I_B$$

$$I_{2b} = \frac{1}{2} \cdot (1 - \alpha_2) \cdot I_B$$

Observing that $I_4 = 0.5 \cdot (I_B - I_A)$, we additionally have:

$$I_{3a} = I_{2a} - I_4 \qquad (10)$$
$$= \frac{1}{2} \cdot (1 + \alpha_2) \cdot I_B - \frac{1}{2} \cdot (I_B - I_A)$$
$$= \frac{1}{2} \cdot \left(1 + \frac{I_B}{I_A} \cdot \alpha_2\right) \cdot I_A$$

and similarly $$I_{3b} = \frac{1}{2} \cdot \left(1 - \frac{I_B}{I_A} \cdot \alpha_2\right) \cdot I_A \qquad (11)$$

Using the translinear principle, in which certain products of currents may be equated to other products of currents, we find that:

$$I_{o1A} \cdot I_{2b} = I_{o2A} \cdot I_{2a}, I_{o1B} \cdot I_{2b} = I_{o2B} \cdot I_{2a}, I_{DAC1} \cdot I_{3b} = I_{DAC2} \cdot I_{3a} \qquad (12)$$

and with the definitions provided by equations (9) and the translinear equations (12), equations (10) and (11) reduce to:

$$(1 + \alpha_0) \cdot (1 - \alpha_2) = (1 - \alpha_0) \cdot (1 + \alpha_2) \qquad (13)$$

$$(1 + \alpha_{DAC}) \cdot \left(1 - \frac{I_B}{I_A} \cdot a_2\right) = (1 - \alpha_{DAC}) \cdot \left(1 + \frac{I_B}{I_A} \cdot a_2\right)$$

from which we see $$\alpha_o = \alpha_2 \qquad (14)$$
$$\frac{I_B}{I_A} \cdot \alpha_2 = \alpha_{DAC}$$

and thus $$\alpha_o = \frac{I_A}{I_B} \alpha_{DAC}$$

Hence, the IM2 compensation current is given as $$I_{o1} - I_{o2} = (I_{o1A} + I_{o2B}) - (I_{o2A} + I_{o1B}) \qquad (15)$$
$$= (I_{o2B} - I_{o1B}) - (I_{o2A} - I_{o1A})$$
$$= \alpha_0 \cdot (I_{LF1} - I_{LF2}) I_{o1} - I_{o2} = g_m \cdot v_E \cdot \alpha_{DAC} \cdot \frac{I_A}{I_B}$$

The desired temperature variation can be implemented by letting the current $I_B$ be a bandgap-referenced current, and the current $I_A$ be a combination of bandgap and proportional to absolute temperature (PTAT):

$$I_A = I_{BG} \cdot (1 - \beta_{cal}) + I_{PTAT} \cdot \beta_{cal}$$

$$I_B = \alpha_B \cdot I_{BG} \qquad (16)$$

$$I_{PTAT}(T_0) = I_{BG}$$

This can be done very easily using programmable current mirrors, and we then obtain the desired function, $$I_{o1} - I_{o2} = g_m \cdot \frac{\alpha_{DAC}}{\alpha_B} \cdot \left(1 + \beta_{cal} \cdot \frac{T - T_0}{T_0}\right) \cdot v_E \qquad (17)$$

It should be noted that the form of equation (17) is similar to that of equation (8) above. Thus, FIG. 4 provides a circuit implementation of the compensation branch 104. It should be noted that the gain stage 126 has differential inputs. One input is coupled, via two resistors, to the RF inputs of the mixer core 122 (see FIG. 3). Due to the switching currents of the transistors in the mixing core 122, the signal provided to the input of the gain stage via the resistors contains both AC and DC components. The signal $V_{ref}$ is provided as a second input to the gain stage 126. The voltage $V_{ref}$ has a value equivalent to the DC component of the signal provided from the mixer core 122. This effectively cancels out the DC component and allows the gain stage 126 to amplify the AC signal only. The voltage $V_{ref}$ may be generated using another mixer with no RF input and using the same local oscillator (LO) input. The transistors of the mixer (not shown) are matched to the transistors of the mixer core 122 such that the DC signal produced by the mixer core (not shown) matches the DC component generated by the mixer core 122.

Due to the circuit topology, we must ensure that $I_B > I_A$. The current $I_B$ current must be set large enough to ensure this. This is done through the $\alpha_B$ current mirror ratio described above.

As previously discussed, component mismatch in the mixer core 122 (see FIG. 3) is a significant cause of IM2 distortion. Another cause of IM2 distortion that should be considered is RF-to-LO coupling within the mixer core 122. Due to mismatch in device capacitances etc. an attenuated version of the RF signal may get coupled to the LO port. This signal will be proportional to the incoming RF current $i_{RF}(t)$ and may be phase shifted by an amount $\phi_{leak}$.

On the LO port we may then have a signal component of the form, $$v_{RFleakLO}(t) = \gamma_{leak} I(t) \cos(\omega_{RF} t + \phi(t) + \phi_{leak}) \qquad (18)$$

where $I(t)$ and $\phi(t)$ are a polar representation of $i_{RF}(t)$ (i.e., $i_{RF}(t) = I(t) \cos(\omega_{RF} t + \phi(t))$).

The mixer core 122 will generate a mixing product between the RF signal on the LO port and the incoming RF current. Thus we obtain a signal component at the mixer output as follows:

$$i_{out\_leak} = k_{mix} v_{RFleakLO}(t) i_{RF}(t) \qquad (19)$$

where $k_{mix}$ is the conversion gain of the mixer core. Expanding the above expression yields:

$$i_{out\_leak}(t) = k_{mix} \gamma_{leak} I(t) \cos(\omega_{RF} t + \phi(t) + \qquad (20)$$
$$\phi_{leak}) I(t) \cos(\omega_{RF} t + \phi(t))$$
$$= \frac{1}{2} k_{mix} \gamma_{leak} I(t)^2 (\cos(\phi_{leak}) +$$
$$\cos(2\omega_{RF} t + 2\phi(t) + 2\phi_{leak}))$$

As with the previous analysis, the high frequency component of equation (20) is easily removed with conventional filtering techniques and need not be considered further. However, it is necessary to consider the low-frequency part of equation (20), which may be represented as follows:

$$i_{\text{out\_leakLF}}(t) = a_{leak}I(t)^2 \qquad (21)$$

where $a_{leak} = \frac{1}{2}k_{mix}\gamma_{leak}\cos(\phi_{leak})$.

As is apparent, $\alpha_{leak}$ is a constant. Thus, the IM2 caused by RF-to-LO leakage can also be corrected by the described calibration method. It is still advisable, however, to avoid RF-to-LO leakage. This can most effectively be done by ensuring low source impedance on the LO port at RF frequencies, (e.g., by using emitter-followers to drive the mixer LO port).

Since the IM2 is statistical in nature because of the variation in components and manufacturing processes, each wireless communication device will require unique calibration current values. In one implementation, the compensation branch 104 is adjusted as part of a final assembly process in a factory test. The process described above provides sufficient correction for the IM2 current in the wireless communication device.

Figure 5:
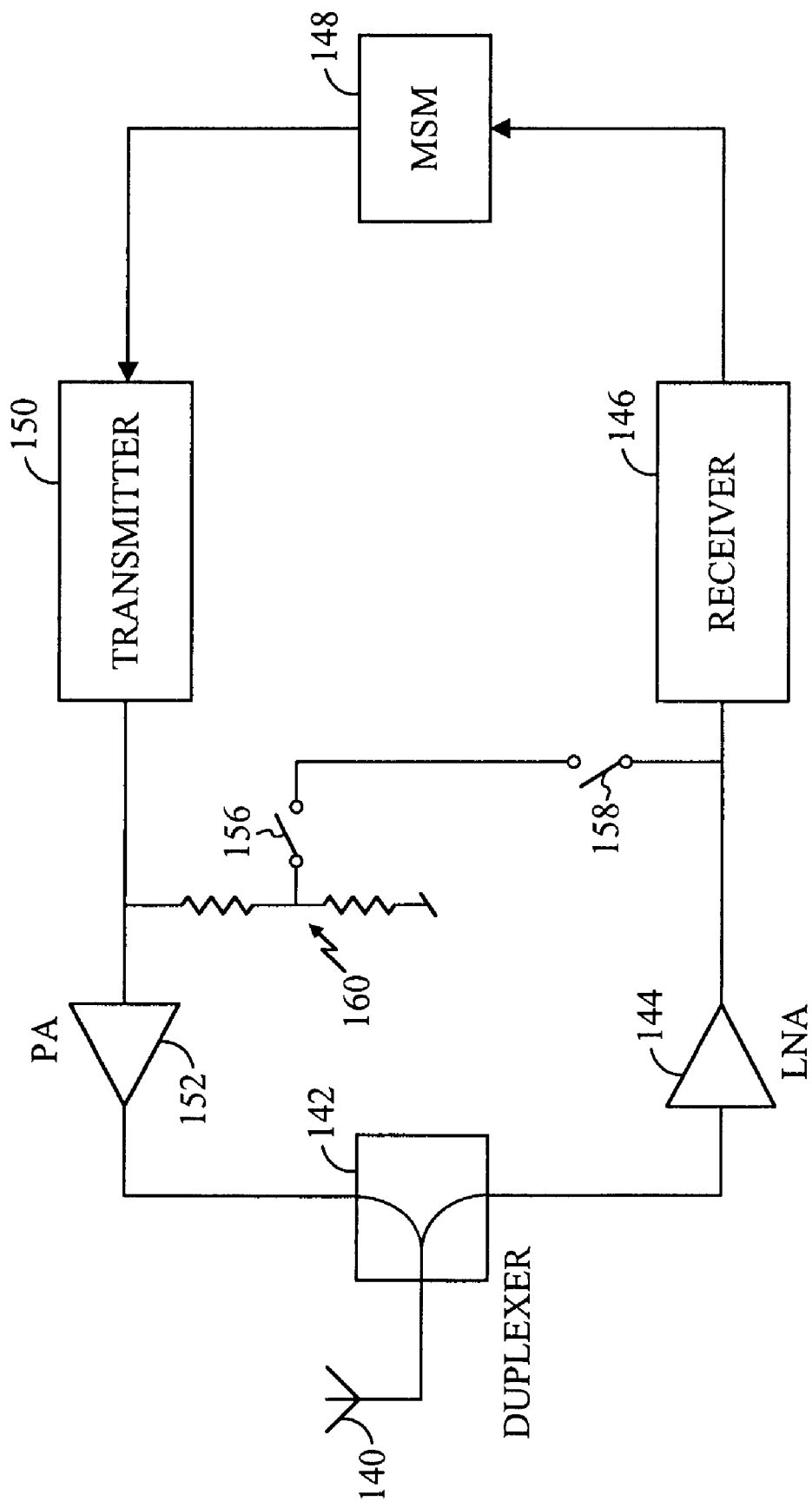
FIG. 5 is a functional block diagram of an alternative implementation of the present invention.

In an alternative embodiment, the wireless communication device may include additional circuitry to provide self-contained auto-calibration. The auto-calibration process can be automatically performed by the wireless device at regular intervals. An auto-calibration circuit is illustrated in the functional block diagram of FIG. 5. The functional block diagram of FIG. 5 comprises an antenna 140 and a duplexer 142. Those skilled in the art will appreciate that the duplexer 142 allows a common antenna to be used for both transmission and reception of RF signals. The output of the duplexer 142 is coupled to a low-noise amplifier (LNA) 144. The output of the LNA 144 is coupled to a receiver 146. Those skilled in the art will appreciate that the receiver 146 generically describes all circuitry involved with the processing of received signals. This includes the RF block 102 and its associated components.

The output of the receiver 146 is coupled to a mobile station modem (MSM) 148. The MSM 148 generically represents circuitry used for signal processing of the baseband signal. The MSM also processes baseband data for transmission. Accordingly, the MSM 148 is also coupled to a transmitter 150. The transmitter 150 is intended to encompass all circuitry involved in the modulation of baseband signals to the appropriate RF signals. The output of the transmitter 150 is coupled to a power amplifier (PA) 152. The PA 152 drives the antenna 140 via the duplexer 142 to transmit the RF signals. The operation of circuit components, such as the MSM 148 and transmitter 150 are well known in the art and need not be described in greater detail herein. The receiver 146 is also a conventional component with the exception of the added circuitry of the compensation branch 104 (see FIG. 2).

Because CDMA is a full-duplex system, the transmitter 150 can be on at the same time as the receiver 146. The present invention takes advantage of this capability by using the transmitter 150 to generate a test signal on which to perform IM2 calibration. The simplified architecture illustrated in FIG. 5 takes advantage of the fact that IM2 distortion does not depend on the absolute frequencies of the signals, but only on their frequency separation. With the PA 152 and LNA 144 turned off, the transmitter 150 can generate a signal that is routed straight to the receiver 146 via semiconductor switches 156 and 158. The output signal from the transmitter 150 is attenuated through a resistive attenuator 160.

The receiver 146 processes the received signal and the IM2 distortion caused by the receiver results in baseband distortion product. The MSM 148 can detect and minimize the distortion product by adjusting the IM2 calibration. Those skilled in the art will recognize that the calibration circuit of FIG. 5 may be used with any form of compensation circuit. Thus, the auto-calibration circuit is not limited to the compensation techniques described above. For example, the auto-calibration circuit of FIG. 5 could be used to compensate for the noise figure, circuit gain, linearity, IM3 signals as well as IM2 signals. In addition, the auto-calibration circuit of FIG. 5 may be used for different forms of IM2 compensation other than the circuit described above with respect to FIGS. 2-4. Thus, the present invention is not limited by the specific form of compensation circuit.

The main signal generated by the transmitter 150 falls far into the stop-band of the baseband filter (not shown) and does therefore not contribute any power at baseband. Consequently, the only power detected by the MSM 148 is the IM2 distortion product and circuit noise. Thus, the MSM 148 can perform the IM2 calibration based on a simple power measurement.

Figure 6:
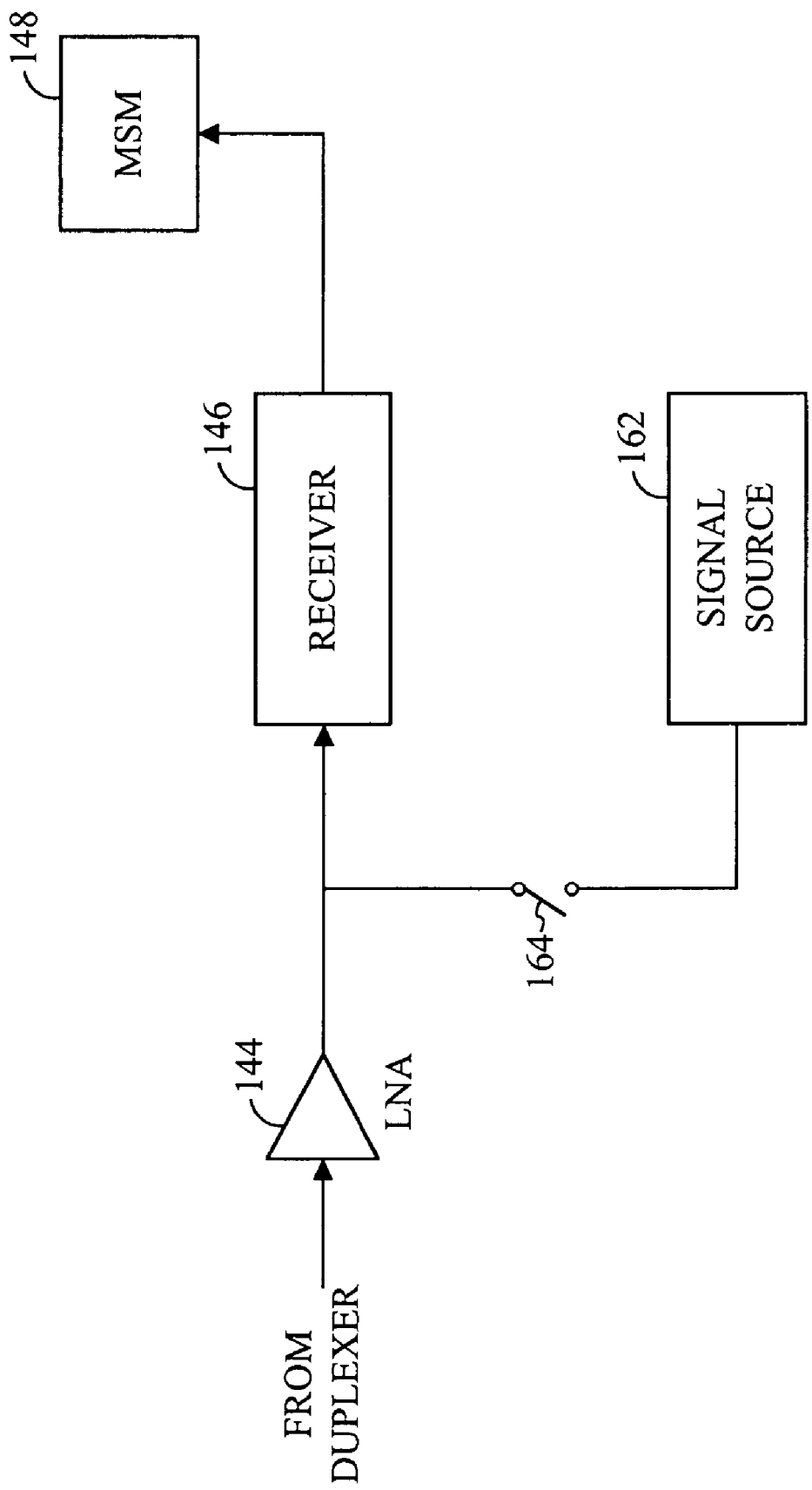
FIG. 6 is a functional block diagram of another alternative implementation of the present invention.

In an alternative embodiment, illustrated in FIG. 6, an internal signal source 162 within the receiver generates the desired test signal. In an exemplary embodiment, the signal source 162 generates a signal having at least two frequency components that are spaced apart by a predetermined frequency. As previously discussed, the wireless receiver may be sensitive to signals that are separated by a frequency of $\Delta\omega_J$.

The signal source 162 is coupled to the input of the receiver 146 by a switch 164. The switch 164 is activated only when the system 100 is placed in an auto-calibration mode. The auto-calibration can be performed at predetermined times, such as when the power is first applied to the wireless communication device. Alternatively, the auto-calibration can be performed periodically at predetermined time intervals.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

The invention claimed is:

1. An automatic calibration circuit for a device having a receiver, the circuit comprising:
    a signal source to generate a test signal;
    a selectively activated switch circuit to couple the signal source to a receiver input terminal when selectively activated to couple the test signal to the receiver input terminal and thereby permit distortion reduction adjustments on the receiver;
    wherein the signal source comprises an internal signal generator; and
    wherein the internal signal generator generates the test signal having multiple frequency components having a predetermined spectral spacing, and the test signal is in a stop-band of a filter of the receiver.

2. An automatic calibration circuit for a device having a receiver and a transmitter, the circuit comprising:
    a signal source comprising the transmitter to generate a test signal;

a selectively activated switch circuit to couple the signal source to a receiver input terminal when selectively activated to couple the test signal to the receiver input terminal, wherein the test signal is in a stop-band of a filter of the receiver; and a transmitter control to control an input signal to the transmitter, the transmitter control being selectively activated during an auto-calibration process to generate the test signal.

3. The circuit of claim 2, further comprising an attenuator coupled to a transmitter output terminal and thereby generate an attenuated output signal, the attenuated output signal being the test signal coupled to the switch circuit.

4. An automatic calibration circuit for distortion reduction in a wireless communication device having a receiver and a transmitter, the circuit comprising:

a signal source comprising the transmitter to generate a test signal;

a selectively activated switch circuit to couple the signal source to a receiver input terminal when selectively activated to couple the test signal to the receiver input terminal, wherein the test signal is in a stop-band of a filter of the receiver, and transmitter control to control an input signal to the transmitter, the transmitter control being selectively activated during an auto-calibration process to generate the test signal.

5. The circuit of claim 4, wherein the signal source comprises an internal signal generator.

6. An automatic calibration circuit for distortion reduction in a device having a receiver means and a transmitter means, the circuit comprising:

signal means comprising the transmitter means for generating a test signal;

switch means for selectively coupling the test signal to a receiver means input terminal when selectively activated, wherein the test signal is in a stop-band of a filter of the receiver means; and control means, selectively activated during an auto-calibration process, to permit the transmitter means to generate the test signal.

7. The circuit of claim 6, wherein the signal means comprises an internal signal generator to generate the test signal.

8. A method for automatic calibration to distortion reduction for a wireless communication device having a receiver and a transmitter, comprising:

generating a test signal using the transmitter, the transmitter being internal to the device;

selectively coupling the test signal to a receiver input terminal when selectively activated, wherein the test signal is in a stop-band of a filter of the receiver, and controlling an input signal to the transmitter during an auto-calibration process to permit the transmitter to generate the test signal.

9. The method of claim 8, wherein generating the test signal comprises generating a test signal having multiple frequency components having a predetermined spectral spacing.

10. An apparatus comprising:

a signal source to generate a test signal;

a receiver comprising:

a squaring circuit for receiving a receiver input signal from a receiver input provided to an input of a mixer in the receiver and generating a squared version of the receiver input signal;

a gain stage for receiving the squared version of the receiver input signal and reproducing second order nonlinear distortion in the receiver; and an output coupling the reproduced second order nonlinear distortion to an output of the receiver to generate a down-converted baseband signal characterized with reduced second order nonlinear distortion; and a selectively activated switch circuit to couple the signal source to the receiver input when selectively activated to couple the test signal to the receiver input.

* * * * *